United States Patent [19]

Hagen

[11] 4,234,445

[45] Nov. 18, 1980

[54] POLYURETHANE SPRAY COMPOSITION CONTAINING LACTONE VISCOSITY MODIFIER

[75] Inventor: Edward L. Hagen, Woodbury, Conn.

[73] Assignee: Uniroyal, Inc., New York, N.Y.

[21] Appl. No.: 6,406

[22] Filed: Jan. 25, 1979

Related U.S. Application Data

[63] Continuation-in-part of Ser. No. 924,105, Jul. 12, 1978, Pat. No. 4,195,148.

[51] Int. Cl.$^3$ .................... C08G 18/12; C08G 59/56; C08G 59/62
[52] U.S. Cl. ................ 252/182; 260/30.4 N; 427/421; 427/426; 528/48; 528/61; 528/64; 528/65
[58] Field of Search ............ 252/182; 528/48, 61, 528/64, 65; 260/30.4 N; 427/421, 426

[56] References Cited

U.S. PATENT DOCUMENTS

| | | | |
|---|---|---|---|
| 2,598,803 | 6/1952 | Fadel et al. | 260/30.4 N |
| 3,075,998 | 1/1963 | Lardelli et al. | 252/182 |
| 3,440,086 | 4/1969 | Kerns | 427/426 |
| 3,553,175 | 1/1971 | Ruyter | 252/182 |
| 3,679,636 | 7/1972 | Vogelforge | 260/30.4 N |
| 3,931,115 | 1/1926 | Strassel | 260/858 |

OTHER PUBLICATIONS

Doolittle "Technology of Solvents and Plasticizers", John Wiley, 1956, p. 559.

*Primary Examiner*—Benjamin R. Padgett
*Assistant Examiner*—Irwin Gluck
*Attorney, Agent, or Firm*—James J. Long

[57] ABSTRACT

A method for preparing polyurethane by spraying a mixture of
 (a) polyurethane prepolymer, and
 (b) curative which gives a tack-free time of 15 seconds to 5 minutes,
wherein (a) and/or (b) contain a lactone as viscosity modifier.

4 Claims, No Drawings

POLYURETHANE SPRAY COMPOSITION CONTAINING LACTONE VISCOSITY MODIFIER

This application is a continuation-in-part of my copending application Ser. No. 924,105, filed July 12, 1978, now U.S. Pat. No. 4,195,148, the disclosure of which is hereby incorporated herein by reference.

This invention relates to a method of making a polyurethane, compositions useful in such method, and a polyurethane produced by such method.

Polyurethanes generally comprise as essential components a polyol such as a higher molecular weight glycol, a polyisocyanate such as a diisocyanate, and a curative or chain extender such as a relatively low molecular weight polyamine or polyol. There are numerous applications for polyurethanes which are prepared by spray methods especially when it is desired to apply a coating of polyurethane onto a surface. The two main spray methods are:

(1) One-shot system; and,
(2) Prepolymer system.

In the one-shot system usually two low viscosity streams of materials are employed, namely:

(a) Polyisocyanate; and,
(b) Mixture of polyol and curative.

The one-shot system suffers certain deficiencies especially the sensitivity of the polyisocyanate to moisture. Under humid conditions, even at a relatively short period of exposure to moisture in the air the highly concentrated and reactive polyisocyanate tends to combine with the water present leading to extensive foaming in the resultant polyurethane. The advantages include working with low viscosity liquid materials and the general solubility of curatives in the polyols.

The prepolymer system (2) essentially employs two ingredient feed streams, namely:

(i) Polyurethane prepolymer; and,
(ii) Curative(s);

wherein (i) is a reaction product of polyisocyanate and a suitable polyol having residual isocyanate functionality, and (ii) is a polyamine or polyol essentially used for providing the desired amount of chain extension and/or crosslinking. The disadvantage of this system lies in the rather high viscosity of such prepolymers (i) and the oftentimes solid nature of the curative. It has been the practice to add certain inert volatile organic solvents in order to reduce the viscosity of (i) and place (ii) into solution.

The prepolymer system leads to a product having physical properties superior to those of the one-shot system because in the latter the polyol and curatives compete with each other in the reaction with polyisocyanate, yet, the solvents added (about 30 to 70% by volume) such as toluene, methyl ethyl ketone, ethyl acetate, xylene etc., create hazards to human health because of toxicity or chances of explosion and fires. In addition, these solvents may be lost unless costly ventilation and recovery systems are installed.

This invention relates to the use of a "viscosity modifier" which when added to a urethane prepolymer system, sufficiently decreases viscosity and readily dissolves or solvates useful polyurethane curatives so that the two components—prepolymer and curative—can be readily metered, mixed, and sprayed using conventional commercial spray equipment. The viscosity modifier employed in the invention is a lactone which essentially is not volatile and hence the system is free of volatile solvents.

The invention accordingly pertains to the use of a lactone as a non-volatile modifier to dissolve solid components and to reduce viscosity of urethane prepolymer systems such that they are sprayable on conventional equipment.

A prior commercially available curative for polyurethane prepolymer sold under the trademark "Curene 243" (Anderson Developement Co.) is a mixture of MOCA [4,4'-methylene bis(o-chloroaniline)] and gamma-butyrolactone, but such material is unsuitable for use in the present invention because it cures too slowly, aside from the fact that MOCA is a suspected carcinogen.

Prepolymers useful in this invention are conventional materials made by reacting a polyurethane-forming polyol (frequently a high molecular weight glycol) with an excess of a polyurethane-forming polyisocyanate, preferably an aromatic polyisocyanate, usually a diisocyanate such as tolylene diisocyanate (TDI) or 4,4'-diphenylmethane diisocyanate (MDI) or their polymeric forms. As in conventional practice the tolylene diisocyanate can be 100% 2,4-isomer or a mixture of isomers (e.g., 80/20 or 65/35 mixtures of 2,4-/2,6-isomers). The polyols used to make polyurethanes are frequently poly-(alkylene ether) glycols, also called sometimes polyether glycols, polyester glycols, mixed poly(ether-ester) glycols, polyether triols, polycaprolactone glycols, and the like, of which the following may be mentioned by way of non-limiting illustrative examples:

polytetramethylene ether glycol of 650–2000 molecular weight (MW)
polypropylene ether glycol of 400–3000 MW
polycaprolactone glycol of 500–2000 MW
polyethylene adipate glycol of 500–3000 MW
polyethylene propylene adipate glycol of 500–3000 MW
polyethylene butylene adipate glycol of 500–3000 MW
polybutylene adipate glycol of 500–3000 MW
poly(ethylene oxide)—terminated poly(propylene ether)
glycol of 500–3000 MW Reactive isocyanate contents of the prepolymers ordinarily range from 3 to 12% (by weight). Poly(alkylene ether) glycols and polyester glycols are preferred.

Aside from the prepolymer, the other polyurethane-forming component of the present composition is a curative for the polyurethane. The curative is ordinarily one or more substances containing a plurality of active hydrogen sites, ordinarily two active hydrogens. Most frequently the curative is a polyamine or polyol, especially a diamine and/or diol.

Suitable polyol curatives include ethylene glycol, diethylene glycol, propylene glycol, dipropylene glycol, 1,4-butanediol 1,6-hexanediol, thiodiethanol and others, whereas representative polyamine curatives are methylenedianiline (MDA), trimethylene glycol di-p-aminobenzoate, bis(o-aminophenylthio)ethane, 4,4'-methylenebis(dimethyl anthranilate), ethylenediamine, hexamethylene-diamine, or mixtures of polyols or polyamines or of a polyol and polyamine. The choice of the polyol, polyamine and mixtures thereof depends on the tack-free time desired for the resultant polyurethane. Usually a tack-free time of from 15 seconds to 5 minutes is desirable, preferably from 30 seconds to 2 minutes. The choice of curative or mixtures of curatives depends also on the diisocyanate on which the prepolymer is based. In case of MDI the curative may be a mixture of a relatively high polyol content and a lesser amount of polyamine. On the other hand when curing TDI-based prepolymers polyamine-type curatives are preferred although mixtures of polyamine and polyol are applicable. Whatever the choice of curature or mixture of curatives, it is critical to achieve a tack-free time within the time limits indicated above.

As already mentioned, the addition of a lactone in accordance with this invention greatly reduces the viscosity of such a curative or mixtures of curatives enhancing their sprayability, but such lactones may also be employed to considerably reduce the viscosity of the prepolymers thus making it possible to reduce prepolymer spray temperature and/or possible to use prepolymers having molecular weights (and therefore higher viscosities) higher than it was possible to use heretofore. The latter application of lactones is especially desirable because the higher the molecular weight of the prepolymer the lower the amount of curative required. The final physical properties of the resultant polyurethane may also be improved by increasing the prepolymer molecular weight. Specifically excluded as a curative is 4,4'-methylenebis (o-chloroaniline) because of its suspected carcinogenicity and slow cure rate.

The lactone viscosity modifier employed in the invention has the general formula

wherein R represents an alkylene radical having from 4 to 6 carbon atoms. The alkylene radical may be linear, or it may be branched. The lactone ordinarily has a melting point of from minus 50° to plus 10° C., preferably from minus 45° to 0° C. The lactone ordinarily has a boiling point of from 150° to 250° C., frequently from 160° to 220° C. Typical lactones employed are gamma-valerolactone (dl) (−31; 206), delta-valerolactone (−12.5; 218-220), and gamma-butyrolactone (−42; 206), the latter being preferred. These lactones are readily capable of dissolving the desired curatives and of reducing prepolymer and/or curative viscosity. Conventional plasticizers such as dioctyl phthalate (DOP), butyl benzyl phthalate, dipropylene glycol dibenzoate, etc. reduce viscosity but are far less effective than the lactones of this invention either in reducing viscosity or in solvating curatives.

Equivalent ratios of the reactive components, curatives to prepolymer, ordinarily range from 0.75–1.10, with 0.85–1.05 being typical and 0.90–1.00 preferred.

This invention has significant advantages over spray systems of the prior art. Conventional one-shot spray systems are based on MDI and are always moisture-sensitive. They cannot be used under humid conditions without extensive blowing or foaming due to reaction with moisture. Those of this invention that utilize TDI are free from this limitation. Those of this invention based on MDI are less subject to blowing than one-shot systems since they contain considerably less reactive isocyanate (e.g., 3–12% vs. 25–30% by weight of the one-shot method). Another major advantage of the prepolymer spray system of this invention is reflected in the superior properties of the polyurethane it produces versus those of the one-shot systems. This difference is well-known in the industry and includes such important properties as abrasion resistance, cut and tear resistance and tensile strength. The spray system of this invention also has major advantages when compared to prepolymer systems dissolved in volatile solvents (to facilitate spraying). The major advantages are:

1. The spray can apply high coating thicknesses (25–40 mil; about 0.6–2.0 mm) per pass whereas systems based on the above mentioned solvents can only apply 5–10 mil (0.13–0.25 mm). This decreases application time.

2. Tack-free time is very short (0.5–2.0 min.) compared to solvented systems (15–30 min.) and allows quick recoat and handling.

3. The explosion and inhalation hazards associated with volatile solvents are avoided; there are no limitations arising from environmental regulations on solvents; there is very low toxicity if any.

4. Shrinkage of the coating is reduced or eliminated.

5. The present spray system has less volume than a typical solvent system; there is less material to store and handle.

6. The present system gives little or no sag on vertical surfaces. Solvent systems tend to run.

In order to spray through conventional equipment, the viscosity is desirably 1–3000 cps, with 200–2000 being typical and 300–1000 preferred. This can be accomplished by reducing the viscosity of the prepolymer using a lactone such as gamma-butyrolactone; heating also reduces the viscosity, thereby reducing the amount of lactone that is employed and optimizing physical properties. Ordinarily, the maximum temperature should desirably be about 210° F. (100° C.) since prepolymers have limited thermal stability.

Normally, a prepolymer-lactone mixture may, in typical practice, contain from 1 to 100 parts of prepolymer, preferably from 10 to 100 and especially 75 to 100 parts per one part of lactone by weight. The curatives may be mixed with lactone so that the weight ratio of curative/lactone may range, for example, from 1/10 to 100/1, preferably from 1/5 to 5/1 and most preferably from 1/2 to 2/1. The lactone ordinarily should preferably not be used at levels above 100 pph polyurethane (prepolymer plus curative) by weight in order to avoid polyurethane properties at levels lower than desired. For example, a range of 5 to 100 pph lactone to total polyurethane is frequently possible; 10–50 pph is usually employed.

The curative mixture contains a lactone if it is necessary to place the curative(s) into solution. The lactone must be present in sufficient volume to completely dissolve solid curatives. Its level can be adjusted above that to allow convenient formulation to standard spray mix ratios such as 1:1, to 5:1 by volume.

The invention provides what may be termed a 100% solids polyurethane coating in the sense that the entire spray mixture remains as part of the final polyurethane and there is no question of removing by vaporization a relatively large volume of solvent before the deposit is tack-free or "dried" (solidified or cured). The coating can be applied to a variety of surfaces by spray application. In the mining industry, for example, applications include conveyor idler rolls, chute and hopper linings, sump and tank linings and pipe fittings. Besides providing an abrasion resistant solid coating, the composition can be used as a moisture barrier, a release lining, or a chemical-resistant coating. The coating also provides high gloss and can be readily pigmented. Typical physical property date for a 40 mil sample cured under ambient conditions are listed below:

| | |
|---|---|
| Hardness, Shore A | 80 |
| 100%, Modulus, psi (MPa) | 800 (5.5) |
| 300%, Modulus, psi (MPa) | 1500 (10.4) |
| Tensile Strength, psi (MPa) | 4000 (27.6) |
| Elongation, % | 400 |
| Tear, D-624, Die C, pli (KN/m) | 580 (101) |
| Tear, D-470, pli (KN/m) | 100 (17.5) |
| Tear, Trouser, pli (KN/m) | 170 (29.8) |
| Bell Brittle, °C. | <−62 |
| Specific Gravity | .95–1.08 |
| (Depends on application) | |

Aging data for a 40 mil sample cured under ambient conditions are shown below:
Percent retention of tensile after aging:

| Conditions | % Retention |
|---|---|
| 3 Months, 80% relative humidity, 158° F.(70° C.) | 50–70 |
| 1 Year, water immersion, 158° F.(70° C.) | 25–40 |
| 5 Years, water immersion, 75° F.(24° C.) | 80–100 |

Volume swell after one week at 158° F. (70° C.)

| Solvent | % Swell |
|---|---|
| ASTM Oil #1 | 0.5 |
| ASTM Oil #3 | 5–10 |
| Dioctyl phthalate | 15–20 |
| Toluene | 50–75 |

The two parts of the present spray composition, namely Part A containing the prepolymer and Part B containing the curative dissolved in the lactone, are frequently employed at a mix ratio of 3:1 by volume, the recommended processing temperature being 180° F. (80° C.).

Typical viscosity data on the two parts are as follows:

| PART A | | | |
|---|---|---|---|
| | Viscosity | | Specific Gravity |
| 75° F. | 1000 cps | ( 1.0 Pa.s) | 1.07 |
| 158° F. | 700 cps | (0.70 Pa.s) | 1.05 |
| 175° F. | 450 cps | (0.45 Pa.s) | 1.04 |
| 212° F. | 200 cps | (0.20 Pa.s) | 1.02 |

| PART B | | | |
|---|---|---|---|
| | Viscosity | | Specific Gravity |
| 75° F. | 300 cps | ( 0.30 Pa.s) | 1.08 |
| 158° F. | 50 cps | (0.050 Pa.s) | 1.05 |
| 175° F. | 40 cps | (0.040 Pa.s) | 1.04 |
| 212° F. | 35 cps | (0.035 Pa.s) | 1.02 |

The composition of the invention by itself exhibits good adhesion to many surfaces. However, where high adhesion is essential, various commercial adhesives can be used (with proper surface preparation and cleaning), such as:

| | | |
|---|---|---|
| Metal Primer | Chemlok* AD-1751 | Thixon* 1244 |
| Urethane to Metal | Chemlok 218 | Thixon 1153 |
| | Chemlok TS-2394-75 | |
| Urethane to Rubber | Chemlok 218 | Thixon AB-1050 |
| Urethane to Urethane | | Thixon AB-975 |

*For applications requiring resistance to high heat and/or moisture, Thixon XAB 1515, Chemlok TS-2394-75, or Conap* AD-1147 is recommended for urethane to metal bonding.

The composition of the invention may be applied with the aid of commercially available equipment. For example, Part A and Part B of the spray formulation may be contained in separate drums, each equipped with an air regulated feed pump adapted to deliver the material to an air regulated proportional metering pump equipped with a heater, from which the materials are delivered to an internal mix spray gun equipped with a mixer either of a kinetic type or of a static mixing tube type. The two parts become intimately mixed together in the mixer immediately prior to spraying from the nozzle. It will be understood that the usual precautions will be taken to protect eyes and skin and provide adequate ventilation or respirator protection. Curing conditions may be conventional (e.g., ambient conditions or elevated temperatures).

The following example, in which all quantities are expressed by weight unless otherwise indicated, will serve to illustrate the practice of the invention in more detail.

EXAMPLE

A polytetramethylene ether glycol (MW 1000)-tolylene diisocyanate prepolymer of 6.3% by weight available -NCO content is used as one component of a spray system. The other is prepared by dissolving 14.3 parts of methylenedianiline curative in 18.7 parts gamma-butyrolactone. Both components are heated to about 160° F. (71° C.) and sprayed at a 3:1 ratio (prepolymer:-curative) by volume using conventional Graco Fluid Systems FSQ 6243(Trademark) equipment with Binks 43-P(Trademark) mixing gun. Equivalent ratio of prepolymer to curative is 1.04 (isocyanate index). The resulting urethane is tack free in less than 60 seconds and has the following physical properties after conditioning at about 75° F. (24° C.) temperature for 2 weeks.

| | |
|---|---|
| Shore A | 90 |
| 100% Modulus | 1350 psi |
| Tensile | 4000 psi |
| Elongation | 310% |
| Tear Strength (ASTM D624) | 580 pli |
| Bell Brittle Point less than −80° F. (−62° C.) | |

*Trademark

What is claimed is:
1. A composition comprising a mixture of:
   (b) curative for a polyurethane prepolymer which gives a tack-free time of 15 seconds to 5 minutes; and
   (c) a lactone having the formula:

wherein R represents an alkylene radical having from 4 to 6 carbon atoms, the curative (b) being dissolved in the lactone (c) and the ratio of curative (b) to lactone (c) being from 1:10 to 100:1, by weight.

2. A composition comprising a mixture of:
(b) curative for a polyurethane prepolymer which gives a tack-free time of 15 seconds to 5 minutes and which is at least one substance selected from the group consisting of ethylene glycol, diethylene glycol, propylene glycol, dipropylene glycol, 1,4-butanediol, 1,6-hexanediol, thiodiethanol, methylene-dianiline, trimethylene glycol di-p-aminobenzoate, bis(o-aminophenylthio) ethane, 4,4'-methylenebis(dimethyl anthranilate), ethylenediamine, and hexamethylene-diamine; and (c) a lactone having the formula:

wherein R represents an alkylene radical having from 4 to 6 carbon atoms, the curative (b) being dissolved in the lactone (c) and the ratio of curative (b) to lactone (c) being from 1:10 to 100:1, by weight.

3. A composition as in claim 2 in which the curative (b) is methylene dianiline.

4. A composition as in claim 2 in which the lactone (c) is gamma-butyrolactone.